Nov. 30, 1965   J. J. FRANKLIN ETAL   3,220,535
HIGH SPEED CONVEYOR WITH WEAR PLATES
Filed July 25, 1963   2 Sheets-Sheet 1
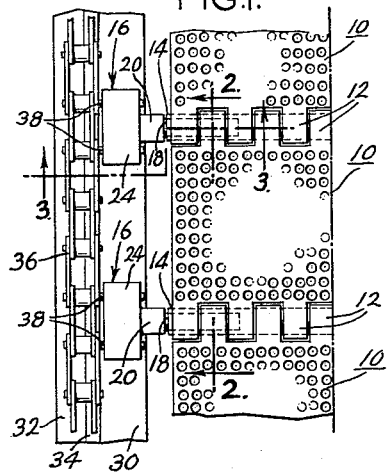
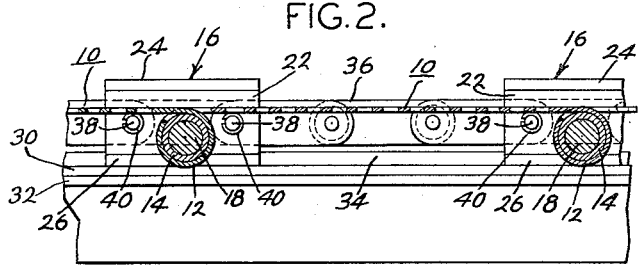
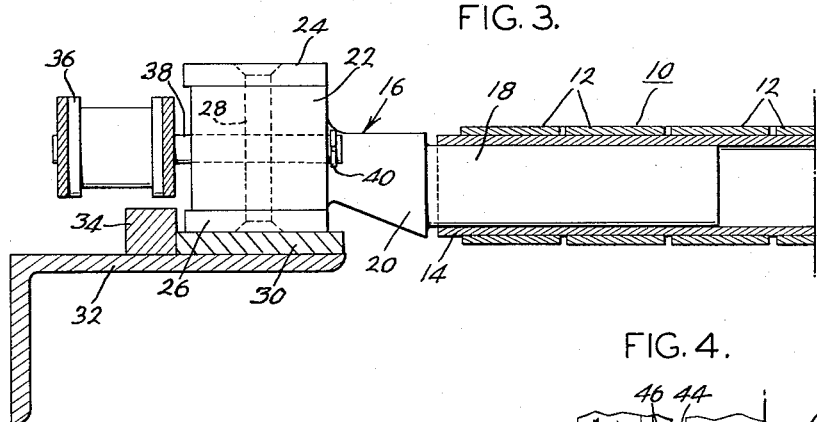
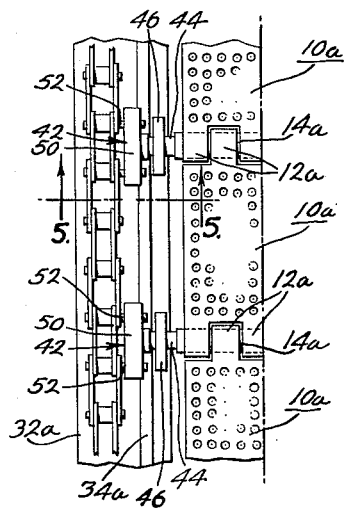
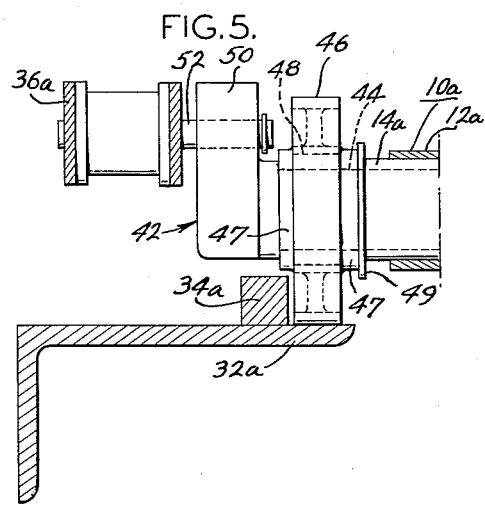
INVENTORS:
JOHN J. FRANKLIN
EDWIN W. HINE II
BY Howson & Howson
ATTYS.

Nov. 30, 1965   J. J. FRANKLIN ETAL   3,220,535
HIGH SPEED CONVEYOR WITH WEAR PLATES
Filed July 25, 1963   2 Sheets-Sheet 2
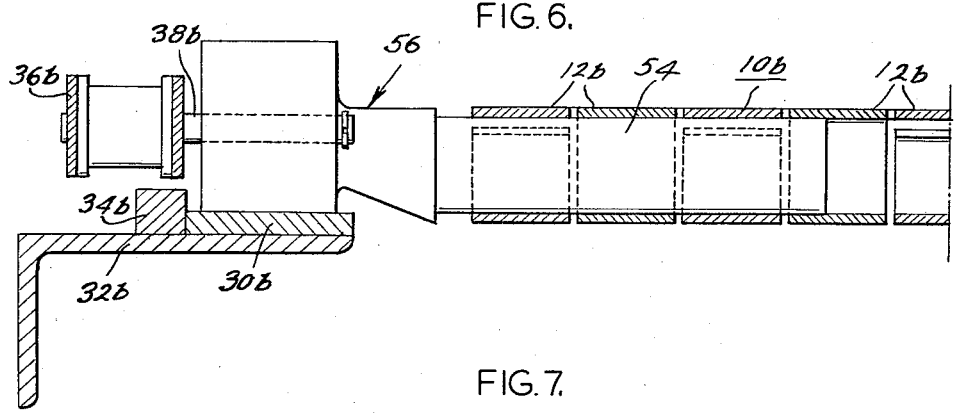
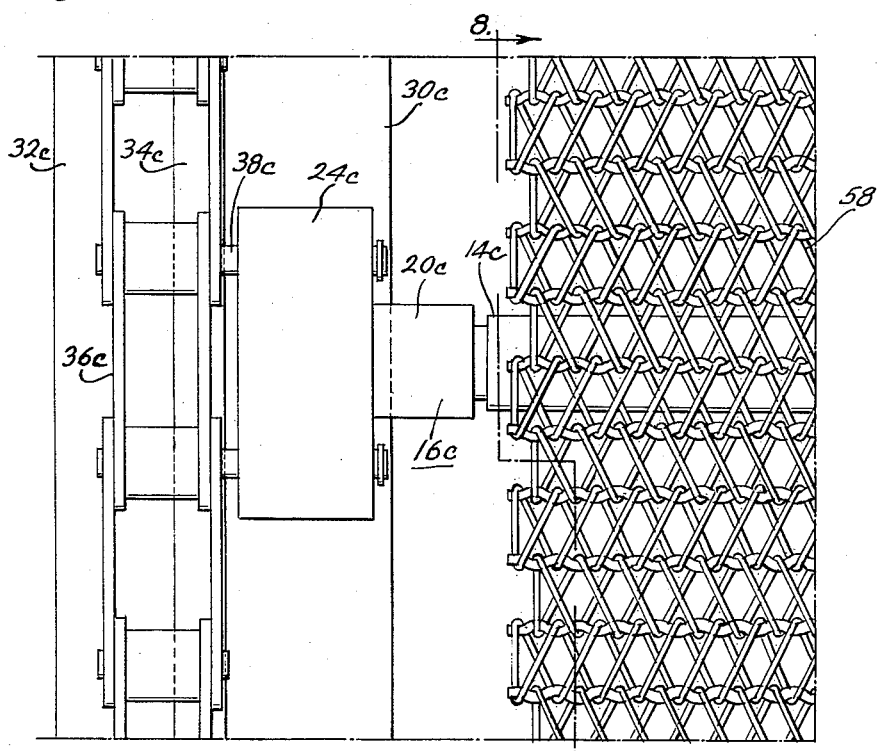
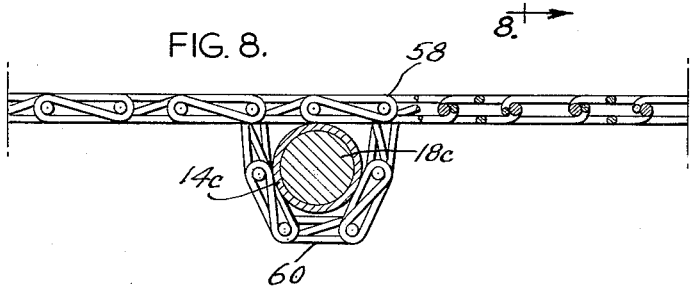
INVENTORS:
JOHN J. FRANKLIN
EDWIN W. HINE II
BY Howson & Howson
ATTYS.

# United States Patent Office 3,220,535
Patented Nov. 30, 1965

3,220,535
HIGH SPEED CONVEYOR WITH WEAR PLATES
John J. Franklin, Glenside, and Edwin W. Hine II, Philadelphia, Pa., assignors to Proctor & Schwartz, Inc., Philadelphia, Pa., a corporation of Pennsylvania
Filed July 25, 1963, Ser. No. 297,524
3 Claims. (Cl. 198—137)

The present invention relates generally to endless belt conveyors of the type characterized by laterally spaced side chains driving transversely extending girts to which the conveyor flooring is attached. The invention is directed particularly to conveyors of the described type which are adapted for high speed operation.

Conveyors of the type noted are commonly used in processing operations such as with granular, sheet-like, fibrous or other materials, and the conveyor floor commonly is composed of spiral wire mesh, perforated sheets, woven screen, or the like. The side chains pass around drive sprockets at the ends of the conveyor flights where the direction of movement of the conveyor changes.

Heretofore conveyors of this type have generally been supported by the side chains, either by having the chain rollers turn on tracks, or by sliding the chain on the chain links. Although such an arrangement may be satisfactory for low speed operation, at high speeds chain wear is rapid, and frequent replacement of the chains is necessary.

It is accordingly a primary object of the present invention to provide a high speed conveyor of the type described, the horizontal runs of which are supported by renewable wear plates or wheels rather than the conveyor chains.

Additional objects and advantages of the invention will be more readily apparent from the following detailed description of embodiments thereof when taken together with the accompanying drawings in which:

FIG. 1 is a plan view of a section of a conveyor embodying the present invention, the horizontal runs of which are supported by wear plates;

FIG. 2 is a sectional view taken along line 2—2 of FIG. 1;

FIG. 3 is a sectional view taken along line 3—3 of FIG. 1;

FIG. 4 is a plan view of a modified embodiment of the invention showing a section of a conveyor, the horizontal runs of which are supported by wheels;

FIG. 5 is a view taken along line 5—5 of FIG. 4;

FIG. 6 is a partial sectional view taken transversely through a further embodiment of the invention in which the conveyor is supported solely by the cylindrical portions of the attachment castings, and the attachment castings bear direcly on the tracks;

FIG. 7 is a plan view of a section of a conveyor of the general type shown in FIGS. 1–3 but having a spiral wire mesh conveyor floor; and FIG. 8 is a sectional view taken along line 8—8 of FIG. 7.

Referring to the drawings, the conveyor embodiment illustrated in FIGS. 1–3 includes perforated plate conveyor floor sections 10 which are linked together in the usual manner by saddle portions 12 through which pass girts 14. The joined floor sections form an endless belt conveyor which in the usual installation includes one or more horizontal conveyor runs.

The conveyor is supported at the girts by the attachment castings 16 each of which includes a cylindrical portion 18 secured within the girt, neck portion 20 extending outwardly therefrom, and a body portion 22 having upper and lower planar surfaces extending parallel with the conveyor belt. Upper and lower sintered bronze wear plates 24 and 26 are secured to the upper and lower surfaces of the attachment castings such as by rivets 28.

The wear plate clad attachment castings slide on the tracks 30 mounted on the angles 32 of the conveyor frame. Guide strips 34 outwardly adjoining the track 30 prevent excessive transverse movement of the conveyor. As shown in FIG. 3, the wear plates may extend outwardly beyond the attachment casting body portions for coaction with the guide strips 34. The upper wear plates are provided to coact with the tracks of the return run of the conveyor (not shown) during passage through which the conveyor is in an inverted disposition.

The conveyor side chains 36 are secured outwardly of the attachment castings by pins 38 extending through the attachment castings and the chain links. The pins pass through the attachment castings and are retained by snap washers 40 engaging slots in the protruding pin ends.

In operation, the conveyor is advanced by the chains 36 which are driven by sprockets at the ends of the conveyor runs. The weight of the conveyor and the load thereon is borne by the attachment castings and the attached wear plates. The wear plates present a large bearing surface area resulting in a low unit loading and reduced frictional wear. The wear plates slide freely along the track 30 and are maintained in the proper transverse disposition by the guide strips 34.

The wear plates are preferably made of sintered bronze because of its desirable lubricant-retaining characteristics. The plates may be easily and inexpensively replaced when worn without necessitating a dismantling of the conveyor.

The present structure is adapted to lightweight design which is of considerable importance due to the destructive acceleration forces developed in high speed conveyor operation. By utilizing a lightweight design, the acceleration forces are minimized and breakage and wear of the components are substantially reduced.

In the modified embodiment shown in FIGS. 4 and 5, wheels are substituted for the sliding wear plates. The conveyor floor sections 10a are pivotally connected by transverse girts 14a, the girts passing through saddle portions 12a of the floor sections in the usual manner. Each attachment casting 42 includes a transversely extending cylindrical portion 44 secured within the girt 14a and extending outwardly therefrom to permit mounting of a wheel 46 having a suitable bearing 48 thereupon. The wheel bears directly on the surface of angle support 32a of the conveyor frame. Collars 47 and washer 49 maintain the wheel in the proper position on the attachment casting. Guide strip 34a on the angle support prevents transverse movement of the wheel-supported conveyor. The attachment casting 42 terminates outwardly in an elongated upwardly offset portion 50 to which the conveyor chain 36a is attached by pins 52.

Although this modified embodiment presents a somewhat more elaborate and expensive solution to the problem, it can be understood that the problems of frictional wear have been practically eliminated in this embodiment while retaining a structure adaptable to lightweight design.

The embodiment shown in FIG. 6 is similar to that of FIGS. 1–3 except that the conveyor is supported solely by the cylindrical portion 54 of the attachment casting 56, and the attachment casting bears directly on the tracks 30b without attached wear plates. Such a construction is considerably lighter and cheaper than that of FIGS. 1–3, although it is adapted for use only with rigid conveyor floors such as the perforated plate type shown which will not be transversely deformed by the conveyor load. This embodiment is best adapted to conveyors of narrow width to minimize such transverse deformation.

The absence of wear plates in this embodiment will of course result in wearing of the attachment casting bearing surfaces. However in view of the large bearing surface area of the castings, the wear should not be unduly rapid, especially with light conveyor loads for which the construction is best suited.

The embodiment of FIGS. 7 and 8 is similar to that of FIGS. 1–3 except for the substitution of a spiral wire mesh conveyor floor 58 for the perforated plate floor 10. As shown in FIG. 8, the spiral wire mesh floor 58 is secured to the girts 14c by spiral wire mesh sections 60 looped around the girts. This type of conveyor due to its inherent flexibility is better suited to installations requiring tortuous conveyor run paths than other types such as the perforated plate type shown in FIGS. 1–6.

In al of the embodiments of the invention illustrated, it is apparent that the rapid chain wear which heretofore characterized conveyors of this general type and required costly and time consuming chain replacement is no longer a problem since the chain does not support the weight of the conveyor or the conveyor load except at the sprockets. The elements which are subject to wear in the present structures may be replaced with little cost and effort. Since the wearing surfaces are of large surface area and are designed specifically for the wear to be expected in high speed conveyor operation, the replacement of these components should be infrequently required.

Manifestly, changes in details of construction can be effected by those skilled in the art without departing from the spirit and the scope of the invention as defined in and limited solely by the appended claims.

We claim:
1. A conveyor comprising planar conveyor floor sections, transversely-extending girts connecting adjacent sections to form an endless conveyor belt, a conveyor frame, tracks on said conveyor frame extending parallel with and spaced outwardly from said conveyor belt, attachment castings secured to said conveyor girts and extending outwardly therefrom, wear plates of a porous, lubricant retaining material connected to and supporting said attachment castings on said tracks for sliding movement therealong, said material operative to maintain a film of lubricant between said material and said tracks, and conveyor chains positioned outboard of and secured to said attachment castings for advancing said conveyor belt along said tracks, said wear plates having relatively high load bearing qualities whereby the weight of said conveyor is supported by said attachment castings, wear plates, and tracks.

2. A conveyor as set forth in claim 1 wherein said wear plates of a porous, lubricant retaining material comprise a sintered metal.

3. A conveyor as set forth in claim 1 wherein said wear plates of a porous, lubricant retaining material, comprise a sintered bronze.

References Cited by the Examiner
UNITED STATES PATENTS

| | | | |
|---|---|---|---|
| 728,390 | 5/1903 | Graham | 198—193 |
| 1,627,354 | 5/1927 | Thorsten | 198—193 |
| 1,708,357 | 4/1929 | Coil et al. | 198—193 |
| 1,800,880 | 4/1931 | Woodman | 198—193 |
| 2,103,680 | 12/1937 | Klaucke | 198—137 X |
| 3,032,170 | 5/1962 | Elkington | 198—131 X |
| 3,140,774 | 7/1964 | Johnston et al. | 198—137 |

SAMUEL F. COLEMAN, *Primary Examiner.*